J. W. KOHLHEPP.
RIGID CARCASS DEHAIRING DRUM.
APPLICATION FILED DEC. 5, 1919.
1,367,056.
Patented Feb. 1, 1921.
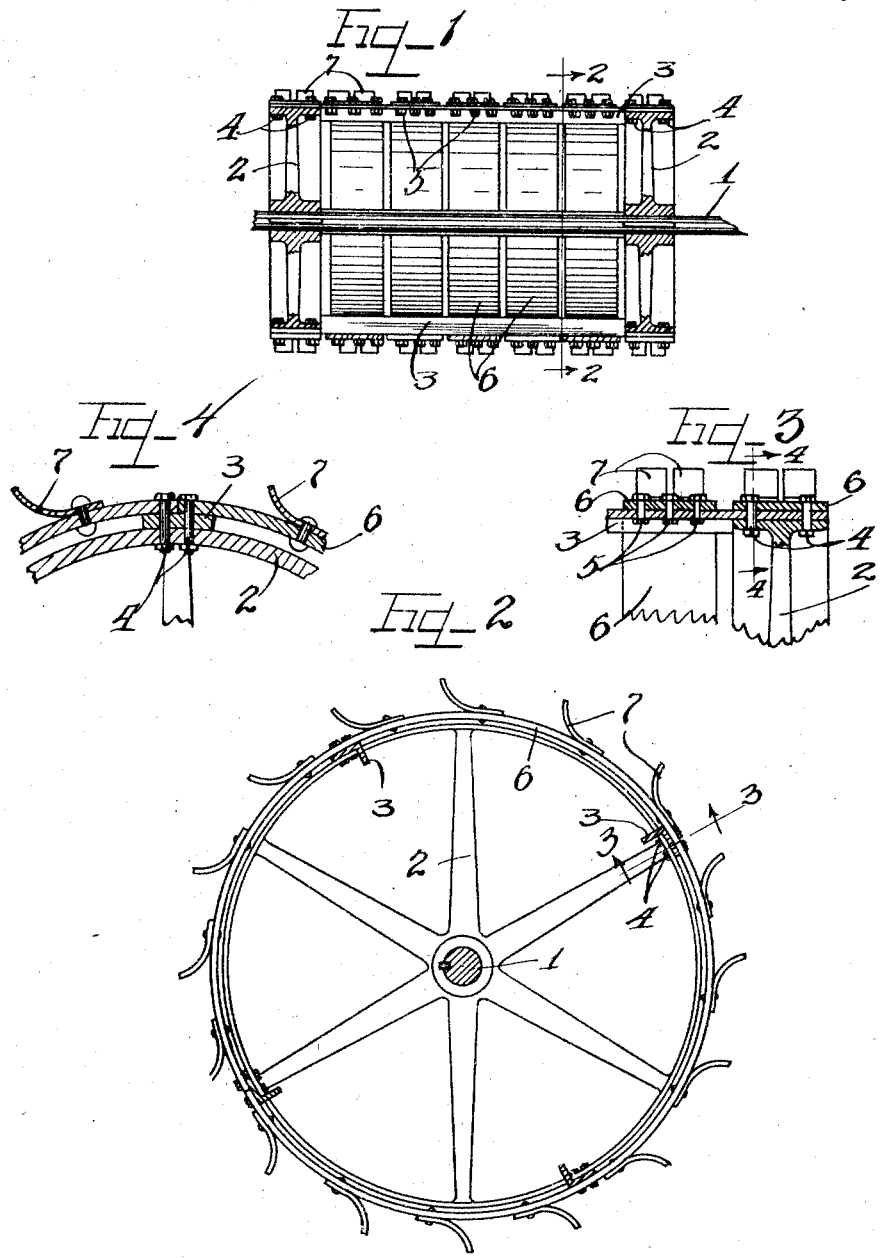

UNITED STATES PATENT OFFICE.

JOHN W. KOHLHEPP, OF CHICAGO, ILLINOIS, ASSIGNOR TO ALLBRIGHT-NELL COMPANY, A CORPORATION OF ILLINOIS.

RIGID CARCASS-DEHAIRING DRUM.

1,367,056.  Specification of Letters Patent.  Patented Feb. 1, 1921.

Application filed December 5, 1919. Serial No. 342,759.

*To all whom it may concern:*

Be it known that I, JOHN W. KOHLHEPP, a citizen of the United States, and a resident of the city of Chicago, in the county of Cook and State of Illinois, have invented certain new and useful Improvements in Rigid Carcass-Dehairing Drums; and I do hereby declare that the following is a full, clear, and exact description of the same, reference being had to the accompanying drawings, and to the numerals of reference marked thereon, which form a part of this specification.

This invention relates more particularly to an improved form of a rigid carcass scraping and dehairing drum adapted to be rotatably mounted to clean and dehair carcasses disposed in the field of operation thereof.

It is an object of this invention to provide a rigid rotatable carcass scraping drum.

Another object of the invention is the construction of a carcass cleaning drum wherein rigid rims are positioned adjacent one another and have scraping blades secured thereon.

It is also an object of the invention to construct a carcass cleaning drum wherein bearing members are rigidly connected together by connecting members on which rigid scraper blade carrying rims are secured adjacent one another.

A further object of the invention is to construct a rigid rotatable carcass cleaning device wherein one of a plurality of connected concentric rigid rims has scraper blades secured thereon.

It is furthermore an object of this invention to construct a rotatable rigid scraper drum having a rigid inner framework for supporting scraper blade carrying rigid rims adjacent one another.

It is an important object of this invention to provide a carcass cleaning drum wherein rigid scraping mechanisms are rigidly mounted on angle members connecting rigid pulley wheels.

Other and further important objects of this invention will be apparent from the disclosures in the drawings and specification.

The invention (in a preferred form) is illustrated in the drawings and hereinafter more fully described.

On the drawings:—

Figure 1 is a central longitudinal section taken through a rigid carcass dehairing drum embodying the principles of this invention.

Fig. 2 is an enlarged sectional view taken on line 2—2 of Fig. 1.

Fig. 3 is a fragmentary detail section taken on line 3—3 of Fig. 2.

Fig. 4 is a fragmentary detail section taken on line 4—4 of Fig. 3.

As shown on the drawings:—

The rigid carcass cleaning and dehairing drum comprises a shaft 1, having keyed or otherwise secured thereon, pulley wheels 2. Rigidly connecting the rims of the pulleys 2, to form a rigid hub or support, are a plurality of spaced parallel angle bars 3, the ends of one flange of each of which is cut away to permit the ends of the remaining flange to be rigidly bolted or otherwise secured to the rims of the pulleys 2. The cut flanges of the bars 3 are disposed to project radially inwardly, as shown in Fig. 2, while the remaining flanges are disposed at right angles to the spokes of the pulleys 2.

Rigidly secured by bolts 4 and 5, or other suitable means to the peripheral flanges of the angle bars 3, are a plurality of adjacently disposed spaced rigid cleaning, massaging or scraping rims 6, all of which form the rigid scraping drum. The rigid metal rims 6, are flat and have riveted or otherwise secured on the outer peripheral surface thereof a plurality of circumferentially disposed metal scraper blades 7, the free ends of which are curved outwardly and may be of any desired length. A rigid scraping drum is thus produced adapted to be rotatably mounted and driven by any suitable source of power for dehairing and cleaning carcasses disposed in the field of operation thereof.

I am aware that numerous details of construction may be varied through a wide range without departing from the principles of this invention, and I therefore do not purpose limiting the patent granted otherwise than necessitated by the prior art.

I claim as my invention:—

1. A carcass scraping drum comprising rigid supporting rims, and rigid scraping rim members secured therearound.

2. A carcass scraping device comprising a plurality of connected concentric rigid members, and scraping means on one of said members.

3. A carcass scraping drum comprising spaced rigid scraping wheels, rigid members rigidly connecting said wheels together, and a plurality of rigid scraping means secured to said members adjacent one another in spaced relation to form intermediate rigid scraping wheels.

4. A carcass dehairing drum comprising a shaft, rigid scraping wheels secured on the ends thereof, a plurality of rigid members connecting said wheels together, and rigid scraping rims secured to said members between said wheels and adjacent one another in spaced relation to afford rigid intermediate scraping wheels.

5. A carcass cleaning device comprising a hub, spokes integral therewith, a rigid inner rim integrally formed on said spokes, a rigid outer rim concentric with said rigid inner rim, rigid means securing said rims together, and scraping members mounted on said rigid outer rim.

6. A carcass scraping device comprising connected co-axial rigid rims, and scraping members secured to the outermost rim.

7. A carcass scraping drum comprising a rigid shaft, rigid pulleys secured thereon in spaced relation, angle bars rigidly connecting said pulleys together, a plurality of rigid rims rigidly secured to said angle bars in spaced relation adjacent one another, and scraper blades rigidly secured peripherally on each of said rigid rims.

In testimony whereof I have hereunto subscribed my name in the presence of two subscribing witnesses:

JOHN W. KOHLHEPP.

Witnesses:
CHARLES W. HILLS, Jr.
EARL M. HARDINE.